(12) United States Patent
Mutya et al.

(10) Patent No.: US 8,688,122 B2
(45) Date of Patent: Apr. 1, 2014

(54) MOBILITY DETECTION AND SYSTEM ACQUISITION IN DUAL STANDBY DUAL SUBSCRIBER IDENTITY MODULES (DSDS)

(75) Inventors: Subbarayudu Mutya, Hyderabad (IN); Shivank Nayak, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 13/355,273

(22) Filed: Jan. 20, 2012

(65) Prior Publication Data

US 2013/0189985 A1 Jul. 25, 2013

(51) Int. Cl.
*H04W 36/00* (2009.01)

(52) U.S. Cl.
USPC ........... 455/436; 455/438; 455/439; 455/440; 455/441; 455/442; 455/437; 455/13.4; 455/41.2; 455/522; 455/574; 455/127.1; 455/127.4; 455/127.5; 370/338

(58) Field of Classification Search
USPC ......... 455/13.4, 41.2, 522, 574, 127.1, 127.4, 455/127.5, 436–444; 370/338
See application file for complete search history.

(56) References Cited

U.S. PATENT DOCUMENTS

| | | |
|---|---|---|
| 2003/0181216 A1 | 9/2003 | Tsai et al. |
| 2008/0113692 A1 | 5/2008 | Zhao et al. |
| 2010/0182970 A1 | 7/2010 | Cherian et al. |
| 2011/0044253 A1 | 2/2011 | Zisimopoulos |
| 2011/0077003 A1* | 3/2011 | Shin .............................. 455/434 |
| 2011/0090870 A1 | 4/2011 | Ronneke et al. |
| 2011/0117965 A1* | 5/2011 | Gong et al. .................... 455/558 |
| 2011/0217969 A1 | 9/2011 | Spartz et al. |
| 2011/0294456 A1 | 12/2011 | Anderson et al. |
| 2012/0088502 A1* | 4/2012 | Chin et al. .................... 455/433 |
| 2012/0322497 A1* | 12/2012 | Navda et al. .................. 455/525 |

FOREIGN PATENT DOCUMENTS

GB 2481702 A 1/2012

OTHER PUBLICATIONS

International Search Report and Written Opinion—PCT/US2013/021301—ISA/EPO—Apr. 12, 2013.

* cited by examiner

*Primary Examiner* — Amancio Gonzalez
(74) *Attorney, Agent, or Firm* — Charles Chesney

(57) ABSTRACT

Aspects of the present disclosure relate to wireless communications and techniques for determining a power save duration for an out of service subscription based, at least in part, on a detected mobility status change of a mobile device. Aspects generally include a mobile device, that shares a single radio resource for establishing connections with a first and second subscription, using a detected mobility status change to determine a power saving duration for an out of service subscription.

40 Claims, 8 Drawing Sheets

MOBILITY DETECTION AND SYSTEM ACQUISITION IN DUAL STANDBY DUAL SUBSCRIBER IDENTITY MODULES (DSDS)

FIELD

Aspects of the present disclosure relate generally to wireless communication systems, and more particularly, to determining a power saving duration for a subscription based, at least in part, on a mobility status of a mobile device.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

In a multi-network environment, a need exists for mobile apparatuses to be able to detect transmissions from more than one base station, even when the multiple base stations operate using different network protocols. The ability to detect multiple network transmissions in this way enables a single apparatus to be assigned multiple Universal Subscriber Identity Modules (USIMs), whereby a user may make a phone call or exchange data using different phone numbers.

In some cases, an apparatus may acquire service on two subscriptions using a single radio. Since both subscriptions share a radio, when one subscription is in a connected mode, the other subscription may be out of service (OOS) due to unavailability of the radio resource. In various situations, including mobility related cases, both subscriptions may compete for radio access. Independent system acquisition for each subscription may have limitations which may lead to a high power consumption of the apparatus and increased probability of page loss due to sharing of the radio resource.

SUMMARY

In an aspect of the disclosure, a method for wireless communications is provided. The method generally includes establishing connections with one or more networks using first and second subscriptions, by a mobile device sharing a single radio resource for both connections, utilizing the single radio resource for the first subscription while out of service for the second subscription, detecting, while out of service in the second subscription, a mobility status change of the mobile device, and determining a power save duration for the second subscription based, at least in part, on the mobility status.

In an aspect of the disclosure, an apparatus for wireless communications is provided. The apparatus generally includes means for establishing connections with one or more networks using first and second subscriptions, by a mobile device sharing a single radio resource for both connections, means for utilizing the single radio resource for the first subscription while out of service for the second subscription, means for detecting, while out of service in the second subscription, a mobility status change of the mobile device, and means for determining a power save duration for the second subscription based, at least in part, on the mobility status.

In an aspect of the disclosure, an apparatus for wireless communications is provided. The apparatus generally includes at least one processor and a memory coupled to the at least one processor. The at least one processor is generally configured to establish connections with one or more networks using first and second subscriptions, by a mobile device sharing a single radio resource for both connections, utilize the single radio resource for the first subscription while out of service for the second subscription, detect, while out of service in the second subscription, a mobility status change of the mobile device, and determine a power save duration for the second subscription based, at least in part, on the mobility status.

In an aspect of the disclosure, a computer-program product for wireless communications is provided. The computer-program product generally includes a non-transitory computer-readable medium having code stored thereon. The code is generally executable by one or more processors for establishing connections with one or more networks using first and second subscriptions, by a mobile device sharing a single radio resource for both connections, utilizing the single radio resource for the first subscription while out of service for the second subscription, detecting, while out of service in the second subscription, a mobility status change of the mobile device, and determining a power save duration for the second subscription based, at least in part, on the mobility status.

DETAILED DESCRIPTION

Aspects of the present disclosure provide techniques for a mobile device, with connections established on one or more networks using a first and second subscription, to determine a power save duration for an out of service (OOS) second subscription. According to aspects both subscriptions may share a single radio resource. If a first subscription is in a connected mode, the mobile device may go out of service (OOS) for the second subscription. As will be described in more detail below, the mobile device may detect a mobility status change of the device while out of service on the second subscription. Based, at least in part, on the detected mobility status change, the mobile device may determine a power save duration for the second subscription.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
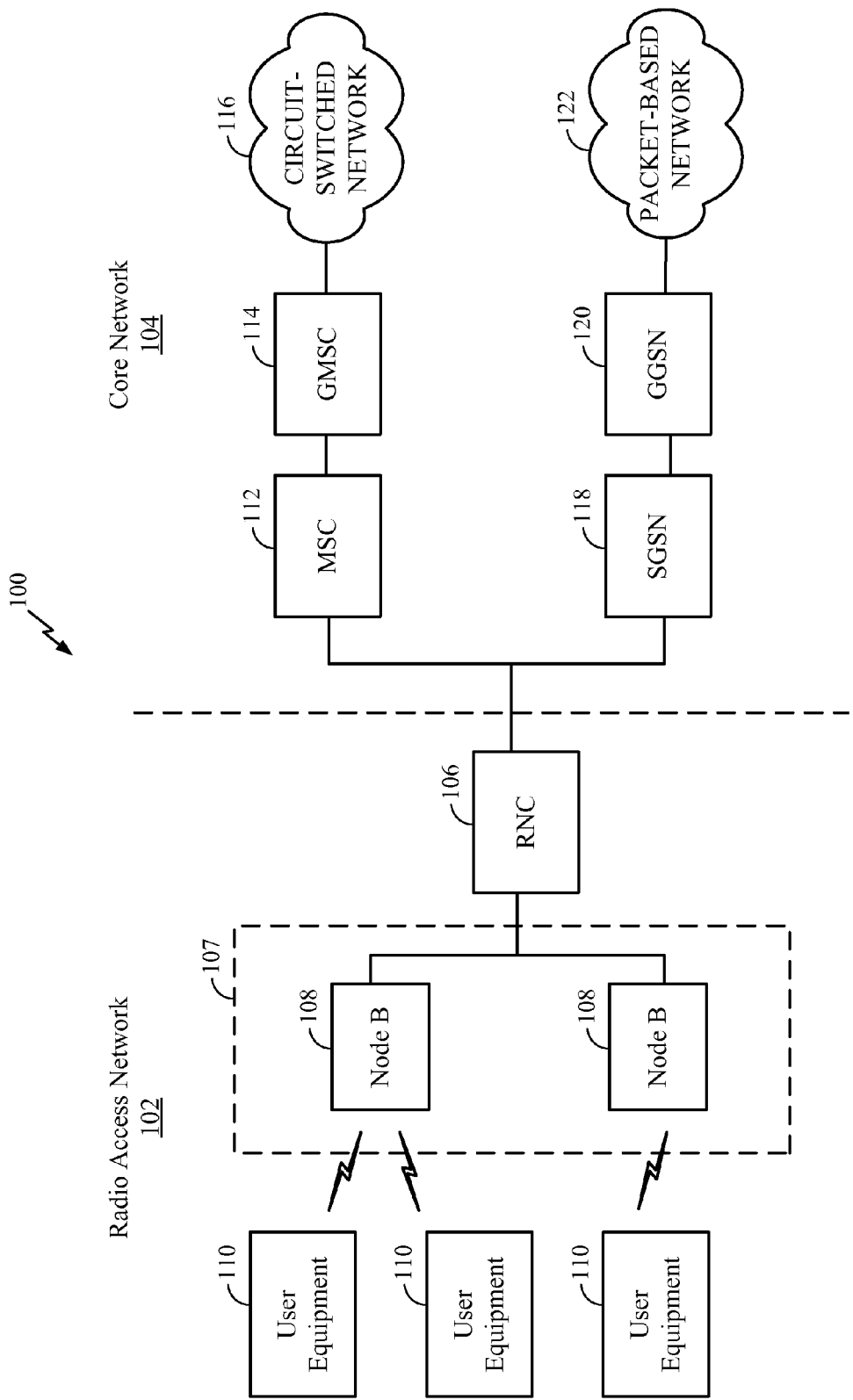
FIG. 1 is a block diagram conceptually illustrating an example of a telecommunications system, in accordance with aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
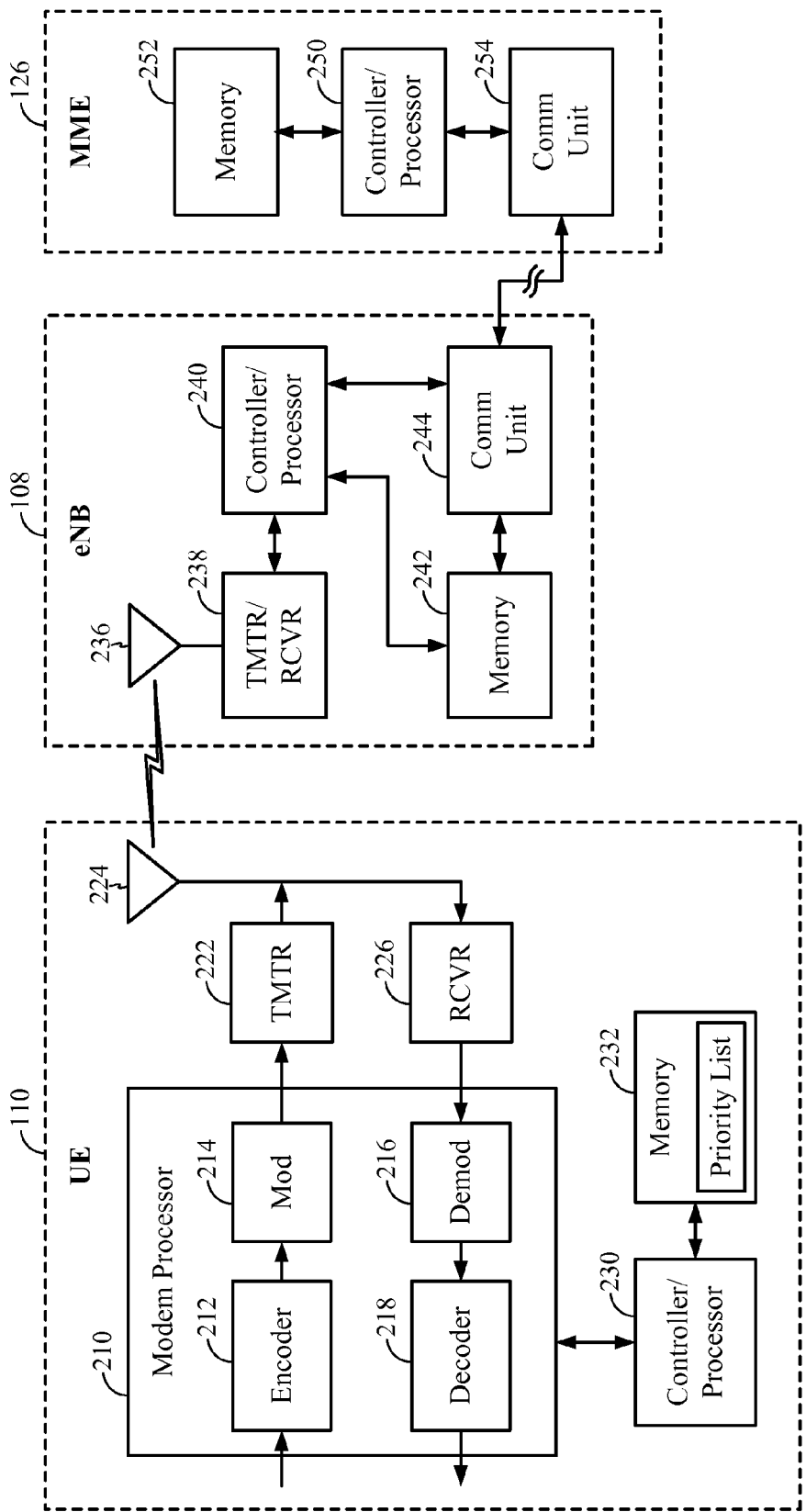
FIG. 2 is a block diagram conceptually illustrating an example of a UE, Node B, and MME, in accordance with aspects of the present disclosure.

FIG. 2 shows a block diagram of a design of UE 110, eNB 108, and MME 126. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 108.

On the downlink, antenna 224 may receive downlink signals transmitted by eNB 108 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIGS. 3 and 4. Memory 232 may store program codes and data for UE 110. Memory 232 may also store a priority list and configuration information.

At eNB 108, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 102 in FIGS. 3 and 4. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

FIG. 2 shows simplified designs of UE 110, eNB 108, and MME 126. In general, each entity may include any number of transmitters, receivers, processors, controllers, memories, communication units, etc., as exemplified in FIG. 3.

Figure 3:
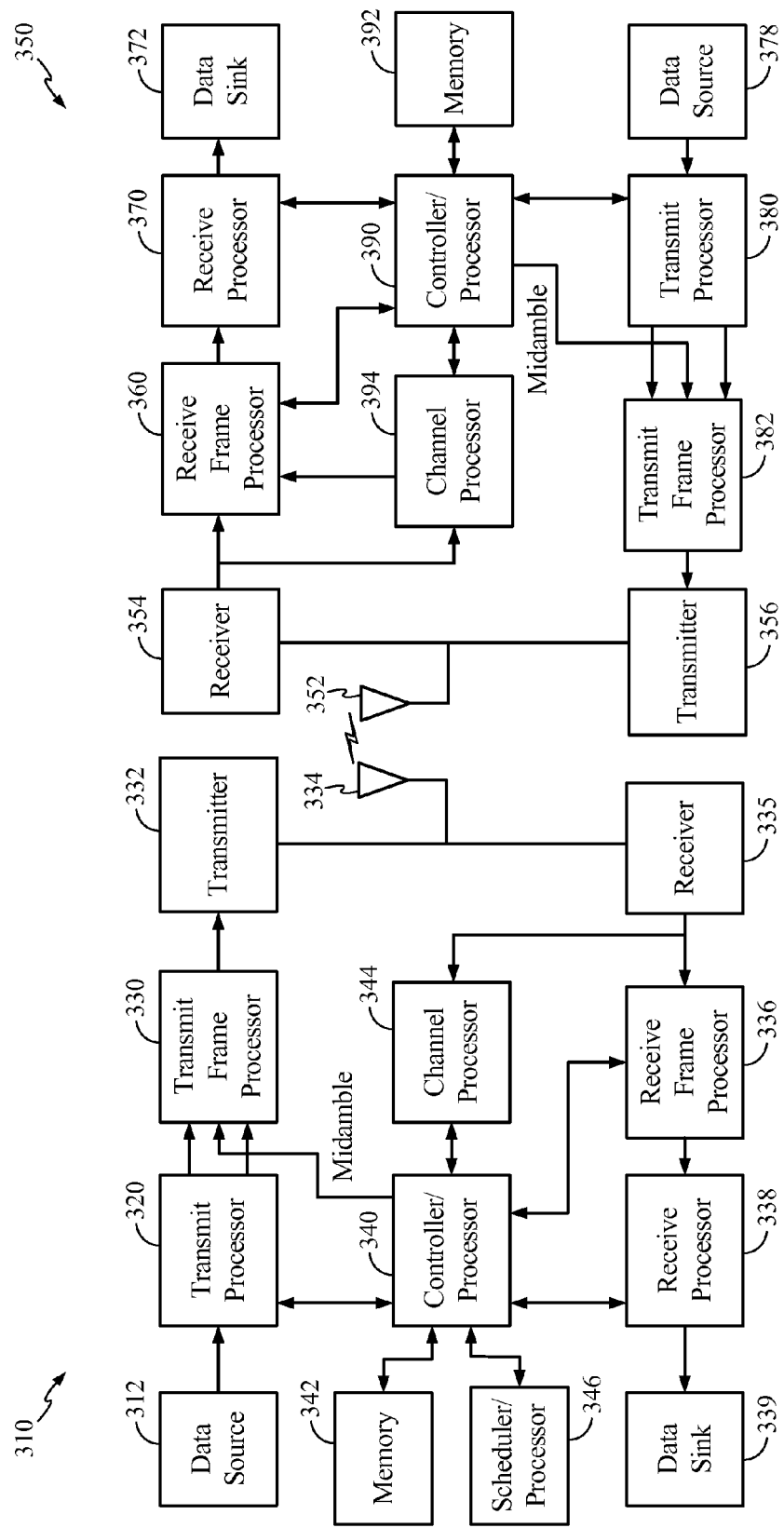
FIG. 3 is a schematic diagram conceptually illustrating an example of a UE and Node B, in accordance with aspects of the present disclosure.

FIG. 3 is a block diagram of a Node B 310 in communication with a UE 350. The UE 350 may be configured to perform operations described herein, for example, utilizing a single radio resource for a first and second subscription, detecting a mobility status change of the device while out of service on one subscription, and determining a power save duration for the out of service subscription based, at least in part, on the mobility status.

The RAN may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble from the UE 350. The symbols generated by the transmit processor 320 are provided to a transmit frame processor 330 to create a frame structure. The transmit frame processor 330 creates this frame structure by multiplexing the symbols with a midamble from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In some cases, a UE may be configured to support more than one Subscriber Identity Module (SIM). This may allow a user to make phone calls using different phone numbers, for example, or establish a high speed data session with one SIM, while still supporting voice calls with another SIM. Each SIM may have a unique International Mobile Subscriber Identity (IMSI), which may be used to identify a mobile phone user within a mobile network. In one aspect, an IMSI may be encoded in a smart card inserted into a mobile phone.

Figure 4:
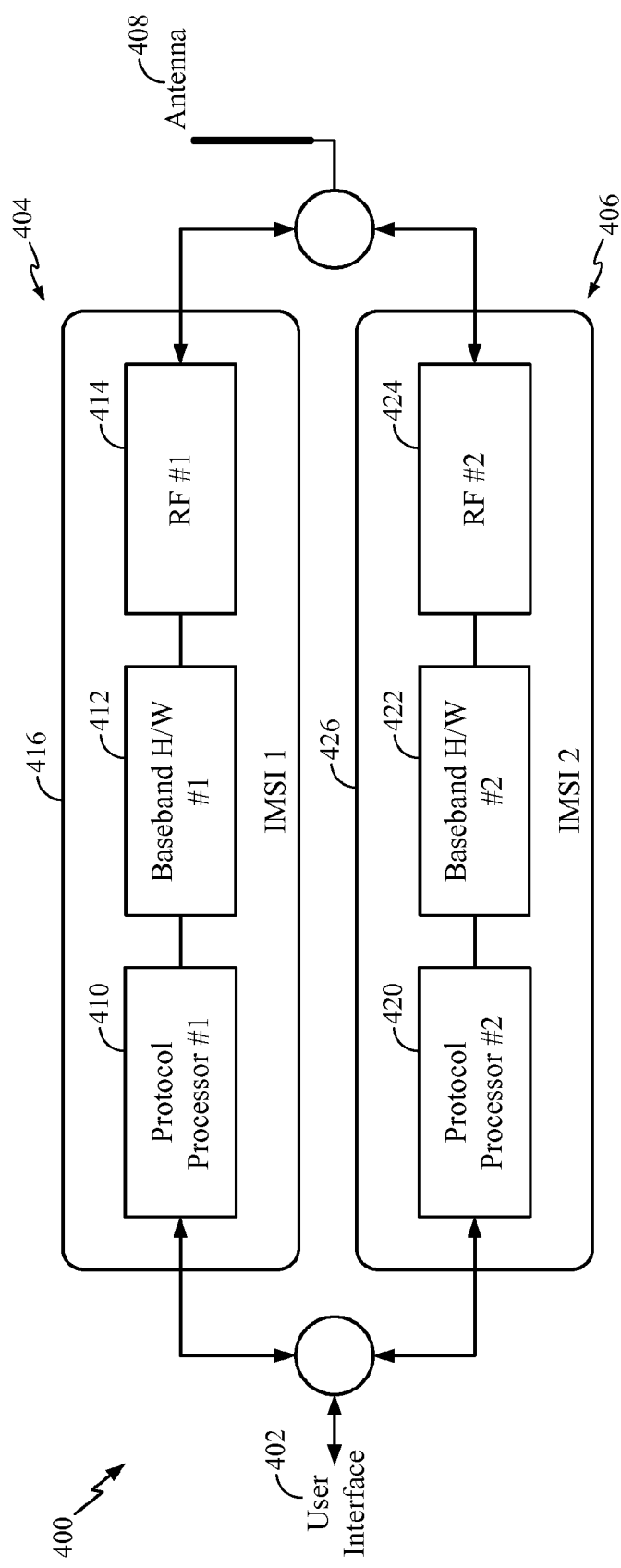
FIGS. 4 and 5 illustrate example UEs capable of supporting multiple subscriber identity modules (SIMs), in accordance with aspects of the present disclosure.

FIG. 4 illustrates one embodiment of a hardware configuration that may support dual SIMs. In one embodiment, a hardware configuration may include dual hardware in which two independent radio frequency (RF) hardware, baseband hardware, and protocol processors are used, each for a USIM. For example, a UE 400 may include a user interface 402, a first hardware module 404, a second hardware module 406, and an antenna 408. The hardware modules 404 and 406 may each include a protocol processor 410 and 420, baseband hardware 412 and 422, and RF hardware 414 and 424. The hardware modules 404 and 406 may each support a radio access technology (RAT). For example, hardware module 404 may support TD-SCDMA, and hardware module 406 may support GSM. In one aspect, each separate hardware module 404 and 406 may be dedicated to a single SIM 416 or 426 (denoted in FIG. 4 as "IMSI-1" and "IMSI-2").

Figure 5:
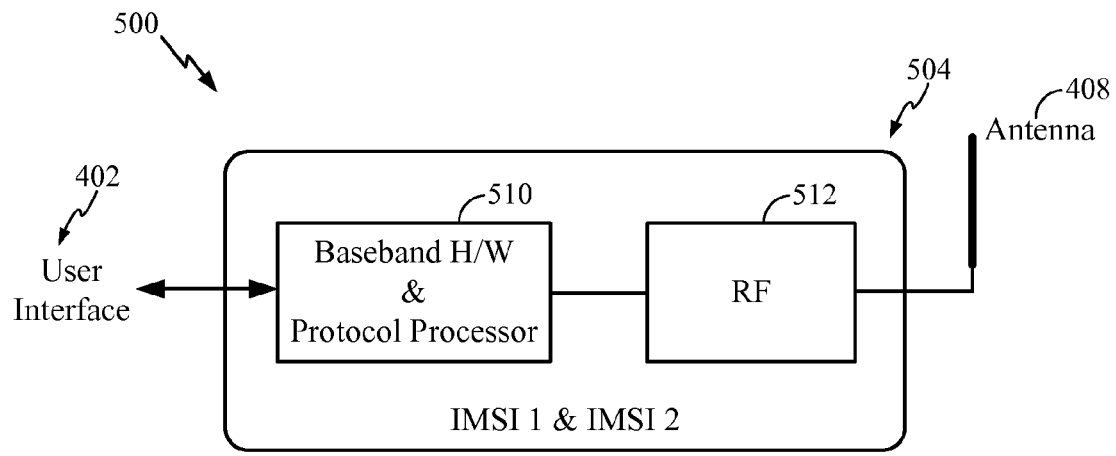

FIG. 5 illustrates another embodiment of a hardware configuration that may support dual SIMs. In one embodiment, a single RF hardware, baseband hardware and protocol processor may be shared by the SIMs. For example, a UE 500 may include a user interface 402, a hardware module 504, and an antenna 408. The hardware module 504 may include a baseband hardware 510, a protocol processor (seen combined with baseband hardware 510), and RF hardware 512. In one aspect, the single RF hardware 512 may transmit and receive with one Node B (NB). The single baseband hardware 510 may process baseband signals simultaneously for both SIMs. The single protocol processor 510 may process both protocol messages and packets simultaneously for both USIMs. In one aspect, since there is one common (RF) hardware for all the calls, there may be some limitations on the UE 500 while in connected mode operations although there may still be multiple calls being established for the dual SIMs.

Mobility Detection and System Acquisition in DSDS

Dual SIM dual standby (DSDS) chipsets may acquire service on two subscriptions using a single radio resource. At times, a mobile device may need to acquire service on either of the subscriptions. For example, the mobile device may perform system acquisition when powering on. After powering on, the mobile device may perform system acquisition if there is a system loss on either of the subscriptions. Additionally or alternatively, the mobile device may perform system acquisition when camped on a cell with limited service.

As illustrated in FIG. 5, when both subscriptions share a single radio hardware resource, if one subscription is in a connected mode, the other subscription may lose service due to unavailability of a radio resource. In certain scenarios, for example mobility related scenarios, both of the subscriptions may compete for radio access.

A mobile device may enter a power saving mode (e.g., sleep mode for a specific duration) when out of service on a subscription and may attempt acquisition after exiting the power saving mode (e.g., after "waking up"). This algorithm may be required for a single SIM mobile device, since once the device is out of service, it may need to periodically wake up and scan again in an effort to detect device mobility and/or if a new cell is available to be acquired. For reasons discussed below, this algorithm may not be optimal for a DSDS device.

According to a first scenario, a DSDS mobile device may be in full service on a first subscription and out of service on a second subscription. As previously described, the mobile device may enter a power saving mode when the device is out of service on a subscription and may attempt acquisition on the second subscription after waking up.

If the mobile device is idle and at the same location when it wakes up from a power saving mode, a scan to find services on the second subscription may not result in acquisition of the second subscription. Instead, due to sharing of the same radio resource, the search may lead to page loss on the first subscription and higher battery usage of the mobile device.

When a user is mobile, a good cell for system acquisition of the second subscription may be available before a power saving timer expires. According to current mobile device implementations, the device may wait until the expiry of the power saving timer before scanning for the second subscription.

According to a second scenario, a DSDS mobile device may be engaged in a voice call on the first subscription. The voice call may result in dedicated use of the radio resource by the first subscription, causing the previously acquired second subscription to go out of service. Accordingly, the second subscription may enter a power saving mode. Depending on when the voice call ends with respect to the second subscription's power saving timer, the mobile device may take up to the maximum time defined by the power saving timer before attempting to acquire service on the second subscription.

As illustrated with these scenarios, independent system acquisition algorithms for each subscription for a mobile device with a DSDS modem may have limitations. These limitations may lead to higher power consumption and increased probability of page loss due to sharing of a radio resource. Additionally, the user may experience a delayed system acquisition of the second subscription. Aspects of the present disclosure provide techniques for using a mobility status change of a mobile device to determine a power save duration for an out of service subscription.

Figure 6:
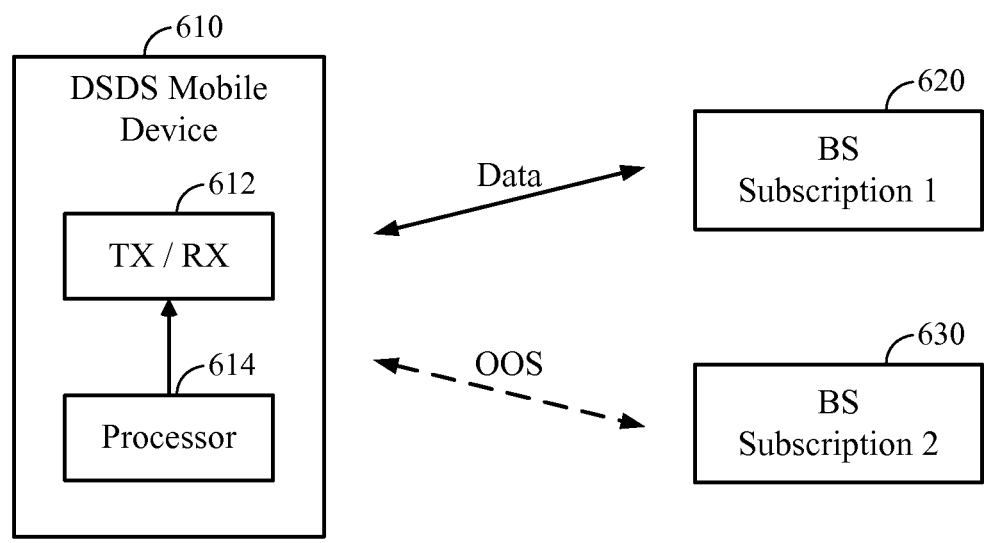
FIG. 6 illustrates an example UE capable of performing operations in accordance with aspects of the present disclosure.

FIG. 6 illustrates an example mobile device 610 with a DSDS modem that may be capable of mobility system detection, in accordance with aspects of the present disclosure. As illustrated, mobile device 610 may have established connections with a first subscription 620 and a second subscription 630. The first subscription 620 and the second subscription 630 may be connected to the same or different networks. Mobile device 610 may have a protocol stack for the first subscription 620 and the second subscription 630 running on different modem processors.

The mobile device 610 may be in a connected mode with the first subscription 620 and may transmit and receive data on the first subscription 620 via transceiver 612. The first and second subscriptions 620, 630 may share the transceiver 612. Accordingly, the mobile device 610 may be out of service on the second subscription 630.

As illustrated, the mobile device 610 may include a processor 614 that may be configured to detect a mobility status change of the device. According to aspects, the processor 614 may be adapted to detect a mobility status change when the mobile device 610 is in an idle mode or a connected mode. Based, at least in part, on the mobility status change of the first subscription, the mobile device 610 may determine a power saving duration for an out of service second subscription 630.

When the mobile device 610 is idle and camped on the first subscription 620, the device may be considered mobile, and therefore may detect a mobility status change, when there is a cell reselection on the first subscription, a location area change of the first subscription, and/or a public land mobile network (PLMN) change of the first subscription. According to aspects, a change in received signal strength indication (RSSI) and/or signal strength of the serving cell of the first subscription may lead to cell reselection of the first subscription. The mobile device 610 may also detect a mobility status change using triangulation by measuring the strength of signals from one or more reachable cells of the first subscription.

When the mobile device 610 is in a connected mode on the first subscription 620, it may detect a mobility status change when there is a cell reselection on the first subscription, a location area change of the first subscription, and/or PLMN change of the first subscription. Because the mobile device 610 is in a connected mode, this change may be indicated in a handover message from the network on the first subscription to the mobile device. A change in RSSI or signal strength of the serving cell may lead to cell reselection of the first subscription. A mobile device 610 may detect a change in RSSI or signal strength of the serving cell through measurements preformed while in the connected mode. As previously described, the mobile device 610 may detect a mobility status change using triangulation implemented, for example, by measuring the RSSI signal strength.

Figure 7:
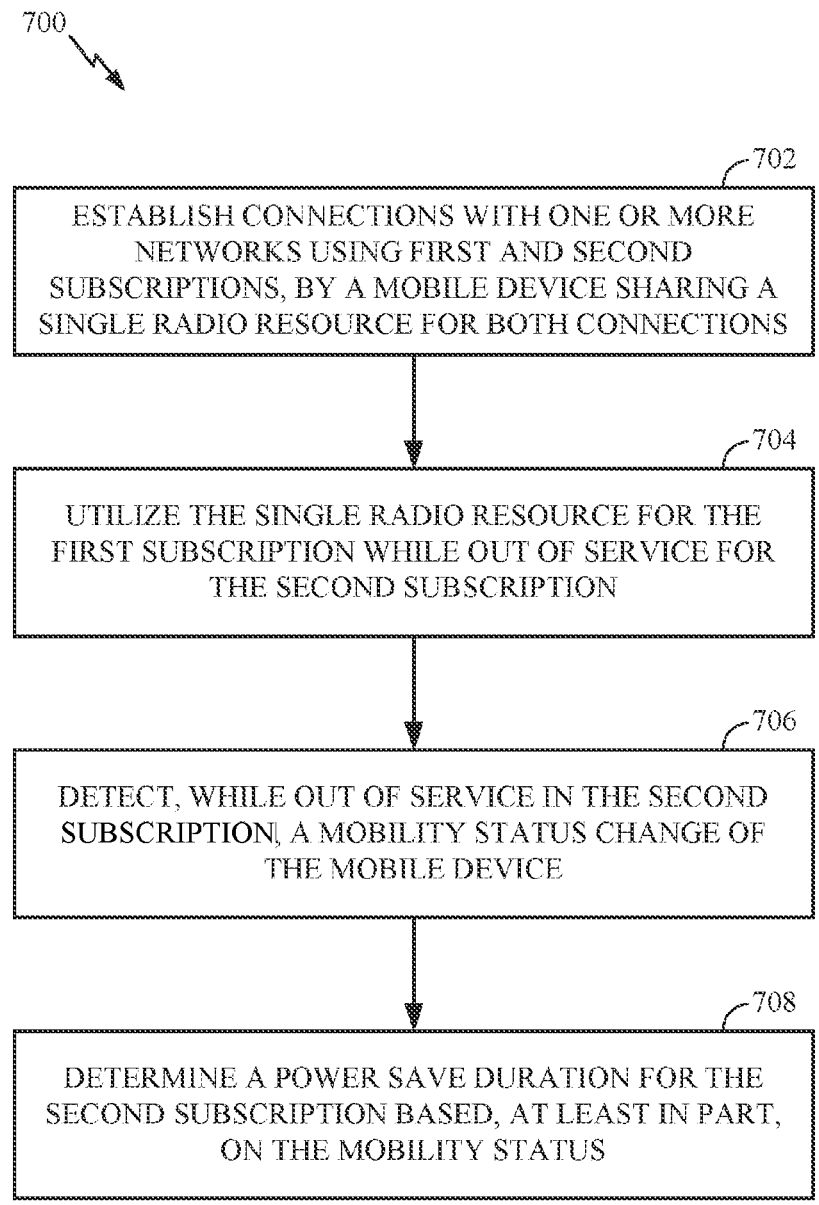
FIG. 7 illustrates example operations for mobility detection and system acquisition in dual standby dual SIM (DSDS), in accordance with aspects of the present disclosure.

FIG. 7 illustrates example operations 700 for mobility detection and system acquisition, in accordance with aspects of the present disclosure. The operations 700 may be performed, for example, by a mobile device sharing a single radio resource to simultaneously acquire services using more than one subscription, such as mobile device 610 of FIG. 6.

The operations begin, at 702, by establishing connections with one or more networks using first and second subscriptions, by a mobile device sharing a single radio resource for both connections. At 704, the mobile device may utilize the single radio resource for the first subscription while out of service for the second subscription. At 706, the mobile device may detect, while out of service for the second subscription, a mobility status change of the mobile device. At 708, the mobile device may determine a power save duration for the second subscription based, at least in part, on the mobility status.

Figure 8:
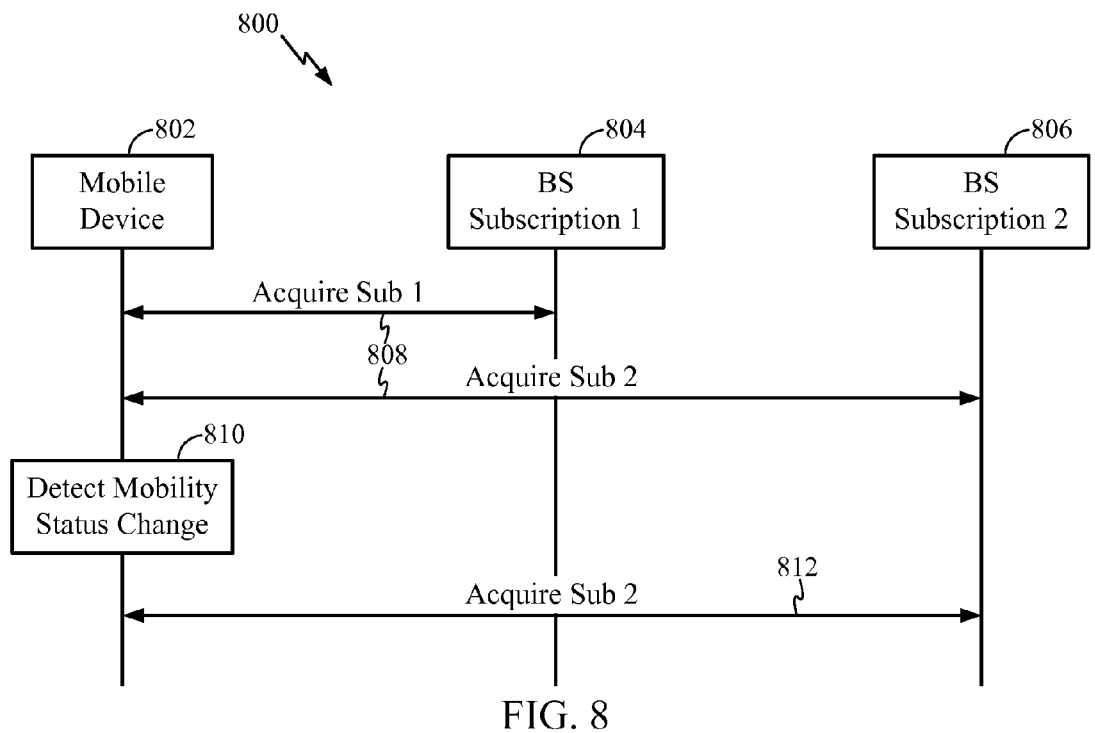
FIGS. 8-9 are example timing diagrams illustrating mobility detection and system acquisition in DSDS, in accordance with aspects of the present disclosure.

FIG. 8 illustrates an example timing diagram 800 for mobility detection and system acquisition in DSDS, according to aspects of the present disclosure. Mobile device 802, a first subscription 804, and a second subscription 806 are illustrated. The mobile device 802 may be a DSDS mobile device that may use a single radio resource to acquire services using more than one subscription, e.g., a first subscription 804 and a second subscription 806. Subscriptions 804, 806 may be connected to the same or different networks.

At 808, the mobile device 802 may acquire the first subscription 804 and the second subscription 806. According to an aspect, the mobile device may be idle in the first and second subscriptions. The mobile device 802 may be camped on a stronger first subscription 804 signal area and may find system loss on the second subscription 806. As will be described in more detail below, the mobile device 802 may attempt system acquisition procedures for the second subscription 806 in response to a detected mobility status change.

According to another aspect, the mobile device 802 may be idle on the first subscription 804 and out of service on the second subscription 806. The mobile device 802 may search for a system on the second subscription 806 based on the detected mobility status change of the first subscription 804. According to aspects, the mobile device may acquire service on the second subscription and may, therefore, be out of service on the first subscription.

Aspects of the present disclosure provide methods for the mobile device 802 to use a non uniform method for acquiring the out of service second subscription 806. The mobile device 802 may initially search for the second subscription 806 in short intervals. If the mobile device does not acquire service for the second subscription, it may sleep for a longer duration and reattempt to search for the second subscription. If the mobile device does not find network signal for the second subscription, it may enter a power saving or deep sleep mode, where the mobile device may search for the second subscription after longer intervals of time.

The mobile device may detect a mobility status change, for example via processor 614 illustrated in FIG. 6. The mobile device may perform system acquisition of the second subscription in response to detecting a mobility status change. This may break the out of service pattern and may immediately start system acquisition on the second subscription.

When the mobile device does not detect a mobility status change, the device may remain in a power saving or deep sleep mode on the second subscription, in an effort to save power.

Referring back to FIG. 8, at 810, the mobile device 802 may detect a mobility status change while out of service on the second subscription 806. The detected mobility status change may trigger the mobile device to wake up. At 812, the mobile device may search for and/or perform system acquisition on the second subscription 806 in response to detecting a mobility status change from the first subscription.

Figure 9:
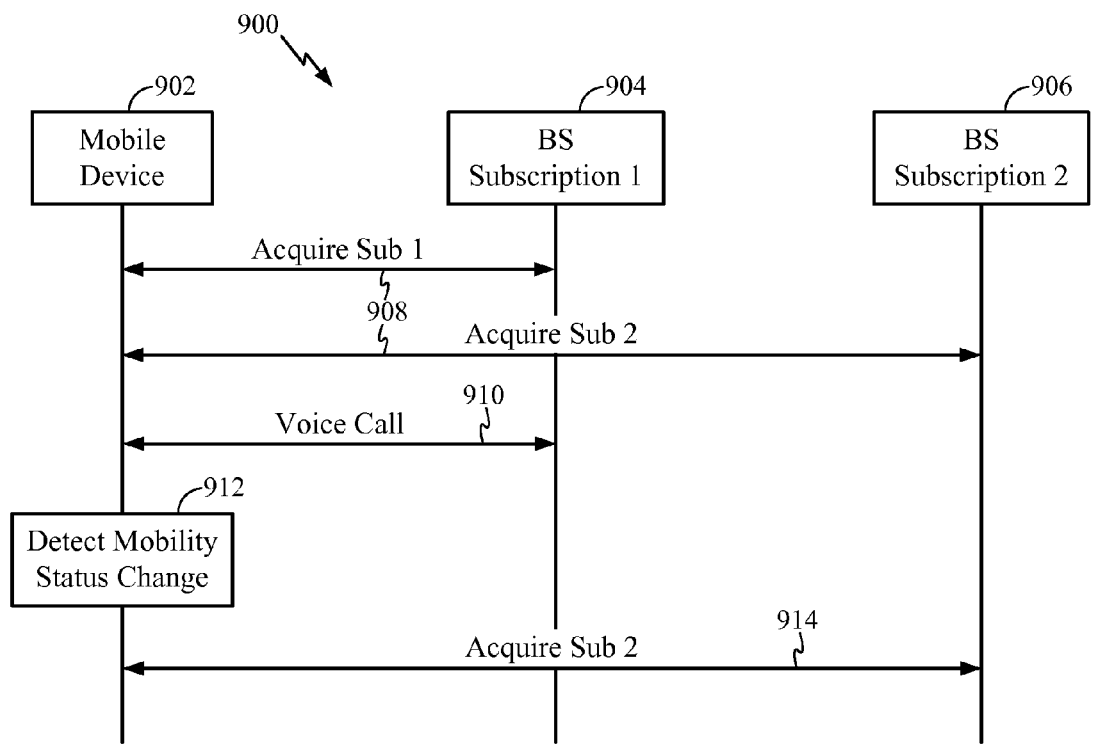

FIG. 9 illustrates an example timing diagram 900 for mobility detection and system acquisition in DSDS, according to aspects of the present disclosure. Similar to FIG. 8, a mobile device 902, a first subscription 904, and a second subscription 906 are illustrated. Mobile device 902 may be a DSDS mobile device that may use a single radio resource to acquire services using more than one subscription, e.g., a first subscription 904 and a second subscription 906. Subscriptions 904, 906 may be connected to the same or different networks.

At 908, the mobile device 902 may acquire a first subscription 904 and a second subscription 906. According to aspects, the mobile device 902 may be camped on a strong first subscription 904 signal area and may be out of service on a second subscription 906.

At 910, the mobile device may acquire a voice call on the first subscription. The voice call may be a mobile originated call on the first subscription or a mobile terminated call on the first subscription. The mobile device 902 may use the single radio resource for the first subscription 904 while out of service on the second subscription 906. According to aspects of the present disclosure, the mobile device may search for the out of service second subscription 906 using a non uniform out of service method described below.

At 912, the mobile device 902 may detect, for example via a processor 614 of FIG. 6, a mobility status change. After the mobile originated call ends or the mobile terminated call ends, the mobile device may, at 914, search for and perform system acquisition on the second subscription 906. If the mobile device does not detect a mobility status change, it may remain in the power saving or deep sleep mode, in an effort to save power.

As described herein, a mobile device sharing a single radio resource for simultaneously acquiring services on one or more networks may use a mobility status change of a first subscription to search for and/or acquire service on a second subscription where the device had previously lost service. When the mobile device does not detect a mobility status change of the first subscription, the mobile device may save power by remaining in a power saving mode. When a mobility status change of the first subscription is detected, the mobile device may, in certain scenarios, more quickly acquire service on the second subscription.

As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
    establishing connections with at least two networks using first and second subscriptions, by a mobile device sharing a single radio resource for both connections;
    utilizing the single radio resource for the first subscription while out of service for the second subscription;
    detecting, while out of service in the second subscription, a mobility status change of the mobile device; and
    determining a power save duration for the second subscription based, at least in part, on the mobility status.

2. The method of claim 1, wherein detecting the mobility status change comprises determining at least one of:
    a cell reselection, a location area change, or a Public Land Mobile Network (PLMN) change of the first subscription.

3. The method of claim 1, wherein detecting the mobility status change comprises:
    determining a detected change in signal strength of a serving cell of the first subscription.

4. The method of claim 1, wherein detecting the mobility status change comprises:
    using triangulation by measuring strength of signals from one or more reachable cells of the first subscription.

5. The method of claim 1, wherein:
    the mobile device is idle in the first and second subscriptions; and
    the method further comprises performing system acquisition of the second subscription in response to detecting the mobility status change.

6. The method of claim 1, wherein:
    the mobile device acquires a mobile originated call on the first subscription; and the method further comprises performing system acquisition of the second subscription after the mobile originated call ends.

7. The method of claim 1, wherein:
the mobile device acquires a mobile terminated call on the first subscription; and
the method further comprises performing system acquisition of the second subscription after the mobile terminated call ends.

8. The method of claim 1, wherein:
the mobile device is idle on the first subscription and out of service on the second subscription; and
the method further comprises searching for a system on the second subscription based on the detected mobility status change.

9. The method of claim 8, wherein the mobile device acquires service on the second subscription and is out of service on the first subscription.

10. The method of claim 1, wherein the mobile device has a protocol stack for the first and second subscriptions running on different modem processors, and wherein the first and second subscriptions share a transceiver.

11. An apparatus for wireless communications, comprising:
means for establishing connections with at least two networks using first and second subscriptions, by a mobile device sharing a single radio resource for both connections;
means for utilizing the single radio resource for the first subscription while out of service for the second subscription;
means for detecting, while out of service in the second subscription, a mobility status change of the mobile device; and
means for determining a power save duration for the second subscription based, at least in part, on the mobility status.

12. The apparatus of claim 11, wherein the means for detecting the mobility status change comprises determining at least one of:
a cell reselection, a location area change, or a Public Land Mobile Network (PLMN) change of the first subscription.

13. The apparatus of claim 11, wherein the means for detecting the mobility status change comprises:
means for determining a detected change in signal strength of a serving cell of the first subscription.

14. The apparatus of claim 11, wherein the means for detecting the mobility status change comprises:
means for using triangulation by measuring strength of signals from one or more reachable cells of the first subscription.

15. The apparatus of claim 11, wherein:
the mobile device is idle in the first and second subscriptions; and
the apparatus further comprises means for performing system acquisition of the second subscription in response to detecting the mobility status change.

16. The apparatus of claim 11, wherein:
the mobile device acquires a mobile originated call on the first subscription; and
the apparatus further comprises means for performing system acquisition of the second subscription after the mobile originated call ends.

17. The apparatus of claim 11, wherein:
the mobile device acquires a mobile terminated call on the first subscription; and
the apparatus further comprises means for performing system acquisition of the second subscription after the mobile terminated call ends.

18. The apparatus of claim 11, wherein:
the mobile device is idle on the first subscription and out of service on the second subscription; and
the apparatus further comprises means for searching for a system on the second subscription based on the detected mobility status change.

19. The apparatus of claim 18, wherein the mobile device acquires service on the second subscription and is out of service on the first subscription.

20. The apparatus of claim 11, wherein the mobile device has a protocol stack for the first and second subscriptions running on different modem processors, and wherein the first and second subscriptions share a transceiver.

21. An apparatus for wireless communications, comprising:
at least one processor configured to:
establish connections with at least two networks using first and second subscriptions, by a mobile device sharing a single radio resource for both connections;
utilize the single radio resource for the first subscription while out of service for the second subscription;
detect, while out of service in the second subscription, a mobility status change of the mobile device; and
determine a power save duration for the second subscription based, at least in part, on the mobility status; and
memory coupled to the at least one processor.

22. The apparatus of claim 21, wherein the at least one processor is configured to detect the mobility status change by determining at least one of:
a cell reselection, a location area change, or a Public Land Mobile Network (PLMN) change of the first subscription.

23. The apparatus of claim 21, wherein the at least one processor is configured to detect the mobility status change by:
determining a detected change in signal strength of a serving cell of the first subscription.

24. The apparatus of claim 21, wherein the at least one processor is configured to detect the mobility status change by:
using triangulation by measuring strength of signals from one or more reachable cells of the first subscription.

25. The apparatus of claim 21, wherein:
the mobile device is idle in the first and second subscriptions; and
the at least one processor is further configured perform system acquisition of the second subscription in response to detecting the mobility status change.

26. The apparatus of claim 21, wherein:
the mobile device acquires a mobile originated call on the first subscription; and
the at least one processor is further configured to perform system acquisition of the second subscription after the mobile originated call ends.

27. The apparatus of claim 21, wherein:
the mobile device acquires a mobile terminated call on the first subscription; and
the at least one processor is further configured to perform system acquisition of the second subscription after the mobile terminated call ends.

28. The apparatus of claim 21, wherein:
the mobile device is idle on the first subscription and out of service on the second subscription; and the at least one processor is further configured to search for a system on the second subscription based on the detected mobility status change.

29. The apparatus of claim 28, wherein the mobile device acquires service on the second subscription and is out of service on the first subscription.

30. The apparatus of claim 21, wherein the mobile device has a protocol stack for the first and second subscriptions running on different modem processors, and wherein the first and second subscriptions share a transceiver.

31. A computer-program product for wireless communications, the computer-program product comprising a non-transitory computer-readable medium having code stored thereon, the code executable by one or more processors for:
  establishing connections with at least two networks using first and second subscriptions, by a mobile device sharing a single radio resource for both connections;
  utilizing the single radio resource for the first subscription while out of service for the second subscription;
  detecting, while out of service in the second subscription, a mobility status change of the mobile device; and
  determining a power save duration for the second subscription based, at least in part, on the mobility status.

32. The computer-program product of claim 31, wherein the code for detecting the mobility status change comprises determining at least one of:
  a cell reselection, a location area change, or a Public Land Mobile Network (PLMN) change of the first subscription.

33. The computer-program product of claim 31, wherein the code for detecting the mobility status change comprises:
  code for determining a detected change in signal strength of a serving cell of the first subscription.

34. The computer-program product of claim 31, wherein the code for detecting the mobility status change comprises:
  code for using triangulation by measuring strength of signals from one or more reachable cells of the first subscription.

35. The computer-program product of claim 31, wherein:
  the mobile device is idle in the first and second subscriptions; and
  the computer-program product further comprising code for performing system acquisition of the second subscription in response to detecting the mobility status change.

36. The computer-program product of claim 31, wherein:
  the mobile device acquires a mobile originated call on the first subscription; and
  the computer-program product further comprising code for performing system acquisition of the second subscription after the mobile originated call ends.

37. The computer-program product of claim 31, wherein:
  the mobile device acquires a mobile terminated call on the first subscription; and
  the computer-program product further comprising code for performing system acquisition of the second subscription after the mobile terminated call ends.

38. The computer-program product of claim 31, wherein:
  the mobile device is idle on the first subscription and out of service on the second subscription; and
  the computer-program product further comprising code for searching for a system on the second subscription based on the detected mobility status change.

39. The computer-program product of claim 38, wherein the mobile device acquires service on the second subscription and is out of service on the first subscription.

40. The computer-program product of claim 31, wherein the mobile device has a protocol stack for the first and second subscriptions running on different modem processors, and wherein the first and second subscriptions share a transceiver.

* * * * *